(12) United States Patent
Kim et al.

(10) Patent No.: US 12,410,301 B2
(45) Date of Patent: *Sep. 9, 2025

(54) PLASTICIZER COMPOSITION AND RESIN COMPOSITION, AND PREPARATION METHOD THEREOF

(71) Applicant: LG Chem, Ltd., Seoul (KR)

(72) Inventors: Hyun Kyu Kim, Daejeon (KR); Mi Yeon Lee, Daejeon (KR); Jeong Ju Moon, Daejeon (KR); Joo Ho Kim, Daejeon (KR); Seok Ho Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 646 days.

This patent is subject to a terminal disclaimer.

(21) Appl. No.: 17/729,240

(22) Filed: Apr. 26, 2022

(65) Prior Publication Data

US 2022/0251336 A1 Aug. 11, 2022

Related U.S. Application Data

(63) Continuation of application No. 15/311,749, filed as application No. PCT/KR2016/001261 on Feb. 4, 2016, now Pat. No. 11,359,071.

(30) Foreign Application Priority Data

Feb. 12, 2015 (KR) ........................ 10-2015-0021783
Mar. 25, 2015 (KR) ........................ 10-2015-0041794
(Continued)

(51) Int. Cl.
*C08L 27/06* (2006.01)
*C08J 3/18* (2006.01)
(Continued)

(52) U.S. Cl.
CPC .................. *C08K 5/12* (2013.01); *C08J 3/18* (2013.01); *C08K 5/00* (2013.01); *C08K 5/0016* (2013.01);
(Continued)

(58) Field of Classification Search
CPC ........... C08J 3/18; C08J 2327/06; C08K 5/12; C08K 5/11
See application file for complete search history.

(56) References Cited

U.S. PATENT DOCUMENTS 6,534,577 B1  3/2003  Keller
8,372,912 B2  2/2013  Olsen et al.
(Continued)

FOREIGN PATENT DOCUMENTS

CN  100999590 A  7/2007
CN  101238175 A  8/2008
(Continued)

OTHER PUBLICATIONS

DE20200501934U1 English (Year: 2007).*
(Continued)

*Primary Examiner* — Catherine S Branch
*Assistant Examiner* — Huihong Qiao
(74) *Attorney, Agent, or Firm* — Lerner David LLP

(57) ABSTRACT

Provided are a plasticizer composition and a resin composition, and a preparation method thereof, wherein the present invention may provide a plasticizer, which may improve physical properties, such as plasticizing efficiency, migration, tensile strength, elongation rate, stress resistance, and light resistance, required for a sheet formulation when used as a plasticizer of a resin composition, by improving poor physical properties that have been ascribed to structural limitations, and a resin composition including the plasticizer.

7 Claims, 2 Drawing Sheets

(30) Foreign Application Priority Data

Aug. 12, 2015 (KR) .................. 10-2015-0113875
Oct. 16, 2015 (KR) .................. 10-2015-0144889

(51) Int. Cl.

| | |
|---|---|
| C08K 5/00 | (2006.01) |
| C08K 5/11 | (2006.01) |
| C08K 5/12 | (2006.01) |
| C08K 5/1515 | (2006.01) |
| C08K 13/00 | (2006.01) |
| C08L 101/00 | (2006.01) |

(52) U.S. Cl.

CPC .............. *C08K 5/11* (2013.01); *C08K 5/1515* (2013.01); *C08K 13/00* (2013.01); *C08L 101/00* (2013.01); *C08J 2323/06* (2013.01); *C08J 2323/08* (2013.01); *C08J 2323/12* (2013.01); *C08J 2325/06* (2013.01); *C08J 2327/06* (2013.01); *C08J 2375/04* (2013.01); *C08K 2201/014* (2013.01); *C08L 2203/18* (2013.01); *C08L 2203/202* (2013.01); *C08L 2207/04* (2013.01)

(56) References Cited

U.S. PATENT DOCUMENTS

| | | | |
|---|---|---|---|
| 10,377,875 | B2 | 8/2019 | Kim et al. |
| 2002/0198402 | A1 | 12/2002 | Bohnen et al. |
| 2007/0037926 | A1 | 2/2007 | Olsen et al. |
| 2007/0179229 | A1 | 8/2007 | Grass |
| 2007/0287781 | A1 | 12/2007 | Grass et al. |
| 2011/0046283 | A1 | 2/2011 | Grass et al. |
| 2011/0281987 | A1 | 11/2011 | Godwin et al. |
| 2013/0137789 | A1 | 5/2013 | Olsen et al. |
| 2013/0317152 | A1 | 11/2013 | Becker et al. |
| 2013/0317153 | A1 | 11/2013 | Grass et al. |
| 2014/0276527 | A1 | 9/2014 | Sandford et al. |
| 2014/0336319 | A1 | 11/2014 | Kim et al. |
| 2015/0025185 | A1 | 1/2015 | Kim et al. |
| 2015/0225538 | A1 | 8/2015 | Kim et al. |

FOREIGN PATENT DOCUMENTS

| | | | | |
|---|---|---|---|---|
| CN | 102272215 | A | 12/2011 | |
| CN | 102807491 | A | 12/2012 | |
| CN | 103113617 | A | 5/2013 | |
| CN | 103221467 | A | 7/2013 | |
| CN | 103313847 | A | 9/2013 | |
| CN | 103509295 | A | 1/2014 | |
| CN | 103554778 | A | 2/2014 | |
| CN | 104109324 | A | 10/2014 | |
| CN | 104284932 | A | 1/2015 | |
| CN | 104603193 | A | 5/2015 | |
| DE | 202005019340 | U1 * | 1/2007 | ............... C08J 3/18 |
| DE | 102010003415 | A1 | 10/2011 | |
| EP | 1808457 | A1 | 7/2007 | |
| EP | 2777393 | A1 | 9/2014 | |
| JP | 2003226788 | A | 8/2003 | |
| JP | 2010053187 | A | 3/2010 | |
| KR | 20020085812 | A | 11/2002 | |
| KR | 20090058067 | A | 6/2009 | |
| KR | 20090105013 | A | 10/2009 | |
| KR | 20130035493 | A | 4/2013 | |
| KR | 20130067512 | A | 6/2013 | |
| KR | 20130067513 | A | 6/2013 | |
| KR | 20140005908 | A | 1/2014 | |
| KR | 20140027016 | A | 3/2014 | |
| KR | 20140046215 | A | 4/2014 | |
| KR | 101465791 | B1 | 11/2014 | |
| KR | 20150056347 | A | 5/2015 | |
| KR | 20160095875 | A | 8/2016 | |
| WO | 20070021987 | A1 | 2/2007 | |
| WO | 20080140177 | A1 | 11/2008 | |
| WO | 20120069278 | A1 | 5/2012 | |
| WO | 2014181922 | A1 | 11/2014 | |
| WO | 2014195055 | A1 | 12/2014 | |
| WO | 20150072741 | A1 | 5/2015 | |

OTHER PUBLICATIONS

Wang Duoren et al., "Green Plasticizer", Scientific and Technical Documentation Press, Oct. 31, 2011, pp. 1-20.

CAS Registry No. 6422-86-2, Sci Finder® datasheet, American Chemical Society (hereinafter, "Sci Finder® datasheet") (Year: 2019).

Wypych, Ed., "2.2.10 Citrates," Handbook of Plasticizers, 2nd Ed., ChemTec Publishing, Toronto, p. 24 (Year: 2012).

* cited by examiner

PLASTICIZER COMPOSITION AND RESIN COMPOSITION, AND PREPARATION METHOD THEREOF

CROSS-REFERENCE TO RELATED APPLICATIONS

The present application is continuation of U.S. application Ser. No. 15/311,749 filed on Nov. 16, 2016, a national phase entry under 35 U.S.C. § 371 of International Application No. PCT/KR2016/001261 filed on Feb. 4, 2016, which claims the priority to Korean Patent Application Nos. 10-2015-0021783, filed on Feb. 12, 2015, 10-2015-0041794, filed on Mar. 25, 2015, 10-2015-0113875, filed on Aug. 12, 2015, and 10-2015-0144889, filed on Oct. 16, 2015, all the disclosures of which are incorporated herein by reference.

TECHNICAL FIELD

The present invention relates to a plasticizer composition and a resin composition, and a preparation method thereof.

BACKGROUND ART

Typically, with respect to a plasticizer, alcohol reacts with polycarboxylic acid, such as phthalic acid and adipic acid, to form an ester corresponding thereto. Also, in consideration of domestic and foreign regulations limiting phthalate-based plasticizers that are harmful to human body, research into plasticizer compositions, which may replace phthalate-based plasticizers such as terephthalate-based plasticizers, adipate-based plasticizers, and other polymer-based plasticizers, has continued.

In order to manufacture flooring materials, wallpaper, sheet products, an appropriate plasticizer must be used in consideration of discoloration, migration, and processability. A plasticizer, a filler, a stabilizer, a viscosity reducing agent, a dispersant, an antifoaming agent, and a foaming agent are mixed with a PVC resin according to properties required by industry in various use areas, for example, tensile strength, elongation rate, light resistance, migration, gelling property, or processability.

For example, in a case in which inexpensive dioctyl terephthalate is used among plasticizer compositions that are applicable to PVC, its viscosity is high, the absorption rate of the plasticizer is relatively low, and migration is also not good.

Thus, there is a continuous need to research into techniques by which a product better than the dioctyl terephthalate or a novel composition product including dioctyl terephthalate is developed and optimally used as a plasticizer for a vinyl chloride-based resin.

DISCLOSURE OF THE INVENTION

Technical Problem

As a result of continuous research into plasticizers, the present inventors found a plasticizer composition which may improve poor physical properties that have been ascribed to structural limitations, thereby leading to the completion of the present invention.

The present invention provides a plasticizer which may improve physical properties, such as plasticizing efficiency, migration, and gelling property, required for a sheet formulation when used as a plasticizer of a resin composition, a preparation method thereof, and a resin composition including the plasticizer.

Technical Solution

According to an aspect of the present invention, there is provided a plasticizer composition including a terephthalate-based material; and a Citrate-based material, wherein a weight ratio of the terephthalate-based material to the Citrate-based material is in a range of 99:1 to 1:99.

The weight ratio of the terephthalate-based material to the Citrate-based material may be in a range of 95:5 to 50:50.

The weight ratio of the terephthalate-based material to the Citrate-based material may be in a range of 95:5 to 60:40.

The terephthalate-based material may include a single compound selected from the group consisting of di(2-ethylhexyl)terephthalate (DEHTP or DOTP), diisononyl terephthalate (DINTP), dibutyl terephthalate (DBTP), butyl isononyl terephthalate (BINTP), butyl(2-ethylhexyl)terephthalate (BEHTP or BOTP), and (2-ethylhexyl)isononyl terephthalate (EHINTP or OINTP), or a mixture in which one or more compounds are mixed.

The single compound may be di(2-ethylhexyl)terephthalate or diisononyl terephthalate.

The mixture may be a first mixture in which di(2-ethylhexyl) terephthalate, butyl(2-ethylhexyl)terephthalate, and dibutyl terephthalate are mixed, a second mixture in which diisononyl terephthalate, butyl isononyl terephthalate, and dibutyl terephthalate are mixed, or a third mixture in which di(2-ethylhexyl)terephthalate, (2-ethylhexyl)isononyl terephthalate, and diisononyl terephthalate are mixed.

The first mixture may include 3.0 mol % to 99.0 mol % of di(2-ethylhexyl)terephthalate; 0.5 mol % to 96.5 mol % of butyl(2-ethylhexyl)terephthalate; and 0.5 mol % to 96.5 mol % of dibutyl terephthalate.

The second mixture may include 3.0 mol % to 99.0 mol % of diisononyl terephthalate; 0.5 mol % to 96.5 mol % of butyl isononyl terephthalate; and 0.5 mol % to 96.5 mol % of dibutyl terephthalate.

The third mixture may include 3.0 mol % to 99.0 mol % of di(2-ethylhexyl)terephthalate; 0.5 mol % to 96.5 mol % of (2-ethylhexyl)isononyl terephthalate; and 0.5 mol % to 96.5 mol % of diisononyl terephthalate.

The Citrate-based material may include any one selected from the group consisting of a hybrid alkyl-substituted Citrate-based material having 4 to 9 carbon atoms and a non-hybrid alkyl-substituted Citrate-based material having 4 to 9 carbon atoms.

The Citrate-based material may be a non-hybrid alkyl-substituted Citrate-based material having 4 to 9 carbon atoms, and an alkyl group having 4 to 9 carbon atoms of the Citrate-based material may be a linear chain or a branched chain.

The plasticizer composition may further include an epoxidized oil.

The epoxidized oil may be included in an amount of 1 parts by weight to 100 parts by weight based on 100 parts by weight of the plasticizer composition.

The epoxidized oil may include at least one selected from the group consisting of epoxidized soybean oil, epoxidized castor oil, epoxidized linseed oil, epoxidized palm oil, epoxidized stearic acid, epoxidized oleic acid, epoxidized tall oil, and epoxidized linoleic acid.

According to another aspect of the present invention, there is provided a method of preparing a plasticizer composition including preparing a terephthalate-based material and a Citrate-based material; and obtaining a plasticizer compound by blending the terephthalate-based material and the Citrate-based material in a weight ratio of 99:1 to 1:99, wherein the terephthalate-based material is a single compound or a mixture.

When the terephthalate-based material is the mixture, the terephthalate compound may be prepared by a direct esterification reaction in which terephthalic acid reacts with at least one alcohol selected from the group consisting of 2-ethylhexyl alcohol, isononyl alcohol, butyl alcohol, and isobutyl alcohol; or a transesterification reaction in which any one terephthalate selected from di(2-ethylhexyl)terephthalate or diisononyl terephthalate reacts with any one alcohol selected from butyl alcohol or isobutyl alcohol.

According to another aspect of the present invention, there is provided a resin composition including 100 parts by weight of a resin; and 5 parts by weight to 150 parts by weight of the plasticizer composition.

The resin may include at least one selected from the group consisting of ethylene vinyl acetate, polyethylene, polypropylene, polyvinyl chloride, polystyrene, polyurethane, and a thermoplastic elastomer.

The resin composition may be a material of at least one product selected from the group consisting of electric wires, flooring materials, automotive interior materials, films, sheets, wallpaper, and tubes.

Advantageous Effects

A plasticizer composition according to an embodiment of the present invention may provide excellent physical properties, such as migration resistance and volatility resistance, as well as excellent plasticizing efficiency, tensile strength, and elongation rate when used in a resin composition.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
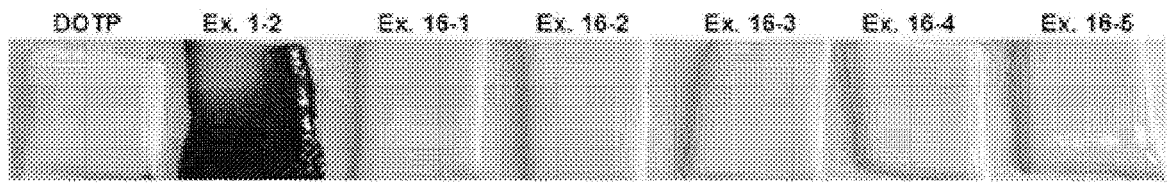
FIG. 1 is an image illustrating the results of heat resistance tests for resins including plasticizer compositions according to the present invention.

Hereinafter, the present invention will be described in detail.

First, the present invention has technical features that provide a plasticizer composition which may improve poor physical properties that have been ascribed to structural limitations.

According to an embodiment of the present invention, a plasticizer composition including a terephthalate-based material may be provided. Specifically, the terephthalate-based material may be used in an amount selected from a range of 1 wt % to 99 wt %, 20 wt % to 99 wt %, 40 wt % to 99 wt %, 50 wt % to 95 wt %, or 60 wt % to 90 wt % based on a total weight of the composition.

The terephthalate-based material, for example, may have a terminal group independently selected from an alkyl group having 1 to 12 carbon atoms, an alkyl group having 3 to 11 carbon atoms, an alkyl group having 4 to 10 carbon atoms, an alkyl group having 8 to 10 carbon atoms, an alkyl group having 8 to 9 carbon atoms, or an alkyl group having 8 carbon atoms.

The terephthalate-based material may be a single compound selected from the group consisting of di(2-ethylhexyl) terephthalate (DEHTP or DOTP), diisononyl terephthalate (DINTP), dibutyl terephthalate (DBTP), butyl isononyl terephthalate (BINTP), butyl(2-ethylhexyl)terephthalate (BEHTP or BOTP), and (2-ethylhexyl)isononyl terephthalate (EHINTP or OINTP), or a mixture in which one or more compounds are mixed.

Specifically, in a case in which the terephthalate-based material is the single compound, the terephthalate-based material may be di(2-ethylhexyl)terephthalate or diisononyl terephthalate. In a case in which the terephthalate-based material is the mixture, the mixture may be one in which three kinds of the terephthalate-based materials are mixed, and, for example, the mixture may be a first mixture in which di(2-ethylhexyl)terephthalate, butyl(2-ethylhexyl)terephthalate, and dibutyl terephthalate are mixed, a second mixture in which diisononyl terephthalate, butyl isononyl terephthalate, and dibutyl terephthalate are mixed, or a third mixture in which di(2-ethylhexyl)terephthalate, (2-ethylhexyl)isononyl terephthalate, and diisononyl terephthalate are mixed.

Specifically, the first to third mixture may have a specific composition ratio, wherein the first mixture may include 3.0 mol % to 99.0 mol % of di(2-ethylhexyl)terephthalate; 0.5 mol % to 96.5 mol % of butyl(2-ethylhexyl)terephthalate; and 0.5 mol % to 96.5 mol % of dibutyl terephthalate, the second mixture may include 3.0 mol % to 99.0 mol % of diisononyl terephthalate; 0.5 mol % to 96.5 mol % of butyl isononyl terephthalate; and 0.5 mol % to 96.5 mol % of dibutyl terephthalate, and the third mixture may include 3.0 mol % to 99.0 mol % of di(2-ethylhexyl)terephthalate; 0.5 mol % to 96.5 mol % of (2-ethylhexyl)isononyl terephthalate; and 0.5 mol % to 96.5 mol % of diisononyl terephthalate.

The composition ratio may be a mixed composition ratio generated by an esterification reaction and may be an intended composition ratio in which a specific compound is further mixed. The mixed composition ratio may be appropriately adjusted to match the desired physical properties.

Also, according to an embodiment of the present invention, the plasticizer composition may further include a Citrate-based material, and the Citrate-based material may include at least one compound selected from the group consisting of a hybrid alkyl-substituted Citrate-based material having 4 to 9 carbon atoms and a non-hybrid alkyl-substituted Citrate-based material having 4 to 9 carbon atoms.

Examples of the hybrid alkyl-substituted Citrate-based material having 4 to 9 carbon atoms may be citrate having a substituent in which alkyl groups having 4 and 8 carbon atoms are combined, such as 1,2-dibutyl 3-(2-ethylhexyl)2-hydroxypropane-1,2,3-tricarboxylate, 1,3-dibutyl 2-(2-ethylhexyl)2-hydroxypropane-1,2,3-tricarboxylate, 1-butyl 2,3-bis(2-ethylhexyl)2-hydroxypropane-1,2,3-tricarboxylate, or 2-butyl 1,3-bis(2-ethylhexyl)2-hydroxypropane-1,2,3-tricarboxylate; and citrate having a substituent in which alkyl groups having 5 and 7 carbon atoms are combined, such as 1,2-dipentyl 3-heptyl 2-hydroxypropane-1,2,3-tricarboxylate, 1,3-dipentyl 2-heptyl 2-hydroxypropane-1,2,3-tricarboxylate, 1-pentyl 2,3-diheptyl 2-hydroxypropane-1,2,3-tricarboxylate, or 2-butyl 1,3-diheptyl 2-hydroxypropane-1,2,3-tricarboxylate. In addition, citrate having a substituent, in which two alkyl groups having a different carbon number selected from 4 to 9 are combined, may be used, and the alkyl group may be a linear chain or a branched chain.

With respect to the non-hybrid alkyl-substituted Citrate-based material having 4 to 9 carbon atoms, the alkyl group having 4 to 9 carbon atoms may be a linear chain or a branched chain, and, for example, tributyl citrate (TBC), tripentyl citrate (TPC), trihexyl citrate (THC), triheptyl citrate (THC), trioctyl citrate (TOC), and trinonyl citrate (TNC) may be used. The butyl group to nonyl group may include their respective structural isomers, for example, an isobutyl group with respect to the butyl group and a 2-ethylhexyl group with respect to the octyl group.

It may be desirable to use the non-hybrid alkyl-substituted Citrate-based material having 4 to 9 carbon atoms in comparison to the hybrid alkyl-substituted Citrate-based material, although the present invention is not limited thereto. Also, tributyl citrate and/or tri(2-ethylhexyl)citrate may be more frequently used.

Trialkyl citrate or di-n-alkyl-m-alkyl citrate may be used with the hybrid or non-hybrid alkyl-substituted Citrate-based material, wherein, in a case in which an acetyl group is present in the Citrate-based material, processability and gelling property may be deteriorated due to the reduction of physical properties, particularly, plasticizing efficiency, of the plasticizer.

In other words, in a case in which the Citrate-based material is an acetyl citrate compound substituted with an acetyl group instead of hydrogen of the remaining hydroxyl group in addition to three ester groups, reduction in various aspects, such as marketability, economic efficiency, and physical properties, may be an issue due to limitations such as the reduction of the plasticizing efficiency, an increased input of the plasticizer to overcome the reduction of the plasticizing efficiency, and the resulting price increase.

Herein, the terephthalate-based material and the Citrate-based material in the plasticizer composition may be included in a weight ratio of 99:1 to 1:99, may be included in a weight ratio of 99:1 to 20:80, 99:1 to 40:60, 99:1 to 50:50, or 99:1 to 60:40, and, for example, may be included in a ratio of 95:5 to 50:50 or 90:10 to 60:40.

The plasticizer composition includes the terephthalate-based material and the Citrate-based material, and may further include epoxidized oil. The epoxidized oil may be included in an amount of 1 parts by weight to 100 parts by weight, preferably, 1 parts by weight to 80 parts by weight, based on 100 parts by weight of the plasticizer composition.

With respect to the mixed plasticizer composition of the terephthalate-based material and the Citrate-based material, heat resistance properties among various physical properties may be relatively poor, and the poor heat resistance properties may be compensated by further including the epoxidized oil. In a case in which the amount of the epoxidized oil is greater than 100 parts by weight, physical properties, such as migration resistance, volatility resistance, or tensile strength, of the mixed plasticizer composition may be relatively deteriorated, and, in a case in which the amount of the epoxidized oil included is less than 1 parts by weight, the poor heat resistance properties may not be compensated. However, if the epoxidized oil is included in the range of 1 parts by weight to 80 parts by weight, properties such as heat resistance, tensile strength, or volatility resistance may be optimized. But, the plasticizer composition can have excellent properties unless the epoxidized oil is greater than 100 parts by weight.

Examples of the epoxidized oil may be epoxidized soybean oil, epoxidized castor oil, epoxidized linseed oil, epoxidized palm oil, epoxidized stearic acid, epoxidized oleic acid, epoxidized tall oil, epoxidized linoleic acid, or a mixture thereof. For example, the epoxidized soybean oil (ESO) or the epoxidized linseed oil (ELO) may be used, but the present invention is not limited thereto.

A blending method may be used as a method of preparing the plasticizer composition in the present invention, wherein the blending method, for example, is as follows:

A terephthalate-based material and a Citrate-based material are prepared, and the plasticizer composition may be prepared by blending the terephthalate-based material and the Citrate-based material in a weight ratio of 1:99 to 99:1, wherein the terephthalate-based material is characterized in that it is a single compound or a mixture.

In a case in which the terephthalate-based material is the single compound, the terephthalate compound may be prepared by a direct esterification reaction in which terephthalic acid reacts with at least one alcohol selected from the group consisting of 2-ethylhexyl alcohol, isononyl alcohol, butyl alcohol, and isobutyl alcohol.

The direct esterification reaction may include: adding terephthalic acid to alcohol and then adding a catalyst to react in a nitrogen atmosphere; removing unreacted alcohol and neutralizing unreacted acid; and dehydrating and filtering by vacuum distillation.

Also, the alcohol used in the blending method may be used in an amount of 150 mol % to 500 mol %, 200 mol % to 400 mol %, 200 mol % to 350 mol %, 250 mol % to 400 mol %, or 270 mol % to 330 mol % based on 100 mol % of the terephthalic acid.

Examples of the catalyst used in the blending method may include at least one selected from the group consisting of acid catalysts such as sulfuric acid, hydrochloric acid, phosphoric acid, nitric acid, para-toluenesulfonic acid, methanesulfonic acid, ethanesulfonic acid, propanesulfonic acid, butanesulfonic acid, and alkyl sulfuric acid; metal salts such as aluminum lactate, lithium fluoride, potassium chloride, cesium chloride, calcium chloride, ferric chloride, and aluminum phosphate; metal oxide such as heteropolyacid; natural/synthetic zeolite; cation and anion exchange resins; and organic metals such as tetra alkyl titanate and polymers thereof. As a specific example, tetra alkyl titanate may be used as the catalyst.

An amount of the catalyst used may vary depending on the type thereof, and, for example, with respect to a uniform catalyst, the amount of the catalyst used may be in a range of 0.01 wt % to 5 wt %, 0.01 wt % to 3 wt %, 1 wt % to 5 wt %, or 2 wt % to 4 wt % based on total 100 wt % of a reactant. With respect to a non-uniform catalyst, the amount of the catalyst used may be in a range of 5 wt % to 200 wt %, 5 wt % to 100 wt %, 20 wt % to 200 wt %, or 20 wt % to 150 wt % based on the total weight of the reactant.

In this case, the reaction temperature may be in a range of 180° C. to 280° C., 200° C. to 250° C., or 210° C. to 230° C.

In a case in which the terephthalate-based material is the mixture, the terephthalate compound may be prepared by the above-described direct esterification reaction and may then be mixed; or the terephthalate compound may be prepared by a transesterification reaction in which any one terephthalate compound selected from di(2-ethylhexyl)terephthalate or diisononyl terephthalate reacts with any one alcohol selected from butyl alcohol or isobutyl alcohol.

The expression "transesterification reaction" used in the present invention denotes a reaction between alcohol and ester to interchange R" of the ester with R' in the alcohol, as illustrated in the following Reaction Equation 1:

[Reaction Equation 1]

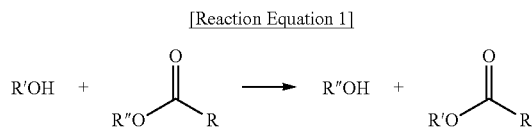

According to an embodiment of the present invention, when the transesterification reaction is performed, three kinds of ester compositions may be generated in three cases, for example, the case in which alkoxide of the alcohol attacks carbon atoms in two ester groups (RCOOR") present in the ester-based compound; the case in which alkoxide of the alcohol attacks carbon atoms in one ester group (RCOOR") present in the ester-based compound; and the unreacted case in which the reaction is not performed.

Also, since the transesterification reaction may not cause wastewater problems in comparison to an esterification reaction between acid and alcohol and may be performed under no catalyst conditions, limitations when using an acid catalyst may be resolved.

For example, a mixture of di(2-ethylhexyl) terephthalate, butyl(2-ethylhexyl)terephthalate, and dibutyl terephthalate may be generated by the transesterification reaction of di(2-ethylhexyl)terephthalate and butyl alcohol, and the three kinds of terephthalates may be formed in an amount of 3.0 wt % to 70 wt %, 0.5 wt % to 50 wt %, and 0.5 wt % to 85 wt %, for example, 10 wt % to 50 wt %, 0.5 wt % to 50 wt %, and 35 wt % to 80 wt %, based on a total weight of the mixture, respectively. A terephthalate-based material (mixture) having high process efficiency, excellent processability, and excellent absorption time may be obtained within the above ranges.

Furthermore, with respect to the mixture prepared by the transesterification reaction, the composition ratio of the mixture may be controlled according to an amount of the alcohol added.

The amount of the alcohol added may be in a range of 0.1 part by weight to 89.9 parts by weight, particularly, 3 parts by weight to 50 parts by weight, and, more particularly, 5 parts by weight to 40 parts by weight, based on 100 parts by weight of the terephthalate compound.

With respect to the terephthalate compound, since the mole fraction of the terephthalate compound participating in the transesterification reaction may be increased as the amount of the added alcohol increases, the amounts of the two terephthalate compounds, as products in the mixture, may be increased and, correspondingly, the amount of the unreacted terephthalate compound may tend to be decreased.

According to an embodiment of the present invention, a molar ratio of the terephthalate compound, as the reactant, to the alcohol, for example, is in a range of 1:0.005 to 1:5.0, 1:0.05 to 1:2.5, or 1:0.1 to 1:1.0, and an ester plasticizer composition having high process efficiency and an excellent improving effect of processability may be obtained within the above-described range.

However, the composition ratio of the mixture of the three kinds of the terephthalate-based materials is not limited to the above-described range, the composition ratio may be changed by further adding any one of the three kinds of terephthalates, and the possible mixed composition ratio is the same as described above.

According to an embodiment of the present invention, the transesterification reaction may be conducted in a temperature range of 120° C. to 190° C., 135° C. to 180° C., and, for example, 141° C. to 179° C. for 10 minutes to 10 hours, 30 minutes to 8 hours, and, for example, 1 hour to 6 hours. The mixture, as the terephthalate-based material having a desired composition ratio, may be effectively obtained within the above temperature and time ranges. In this case, the reaction time may be calculated from the reaching point of the reaction temperature after increasing the temperature of the reactants.

The transesterification reaction may be conducted under an acid catalyst or a metal catalyst, and, in this case, the reaction time may be decreased.

The acid catalyst, for example, may be sulfuric acid, methanesulfonic acid, or p-toluenesulfonic acid, and the metal catalyst, for example, may be an organic metal catalyst, a metal oxide catalyst, a metal salt catalyst, or a metal itself.

The metal, for example, may be any one selected from the group consisting of tin, titanium, and zirconium, or a mixture of two or more thereof.

Also, the method may further include removing unreacted alcohol after the transesterification reaction and a reaction by-product, for example, an ester-based compound, by distillation.

For example, the distillation may be a two-stage distillation for separating the alcohol and the reaction by-product by using a difference of boiling points.

As another example, the distillation may be mixed distillation. In this case, the ester plasticizer composition having a desired composition ratio may be relatively stably secured. The mixed distillation denotes that butanol and the reaction by-product are distilled at the same time.

The direct esterification reaction and the transesterification reaction may also be used in the preparation of the above-described hybrid or non-hybrid citrate compound. In this case, similar to the terephthalate-based material, the Citrate-based material may also be prepared as a mixed composition having a predetermined ratio, and the composition ratio of the mixture generated may be controlled according to the adjustment of the amount of alcohol as a reaction raw material. In addition, in a case in which the Citrate-based material is prepared by the direct esterification reaction or transesterification reaction, the same contents as those used in the preparation of the above-described terephthalate-based material may be used.

The plasticizer composition thus prepared may provide a resin composition that is effective to compound formulation, sheet formulation, and plastisol formulation by being included in an amount of 5 parts by weight to 150 parts by weight, 40 parts by weight to 100 parts by weight, or 40 parts by weight to 50 parts by weight based on 100 parts by weight of a resin selected from the group consisting of ethylene vinyl acetate, polyethylene, polypropylene, polyvinyl chloride, polystyrene, polyurethane, and a thermoplastic elastomer.

For example, the plasticizer composition may be used in the manufacture of electric wires, flooring materials, automotive interior materials, films, sheets, wallpaper, or tubes.

EXAMPLES

Hereinafter, the present invention will be described in detail according to specific examples. The invention may, however, be embodied in many different forms and should not be construed as being limited to the embodiments set forth herein. Rather, these embodiments are provided so that this disclosure will be thorough and complete, and will fully convey the scope of the present invention to those skilled in the art.

Preparation Example 1: Preparation of DOTP 498.0 g of purified terephthalic acid (TPA), 1,170 g of 2-ethylhexyl alcohol (2-EH) (molar ratio of TPA:2-EH=1.0:3.0), and 1.54 g (0.31 part by weight based on 100 parts by weight of the TPA) of a titanium-based catalyst (tetra isopropyl titanate, TIPT) as a catalyst were put in a liter, four-neck reactor equipped with a cooler, a condenser, a decanter, a reflux pump, a temperature controller, and a stirrer, and the temperature was slowly increased to about 170° C. The generation of water was initiated at about 170° C., and an esterification reaction was conducted for about 4.5 hours while continuously introducing nitrogen gas at a reaction temperature of about 220° C. under an atmospheric pressure condition. The reaction was terminated when an acid value reached 0.01.

After the completion of the reaction, distillation extraction was performed for 0.5 hours to 4 hours under reduced pressure in order to remove unreacted raw materials. Steam extraction was performed for 0.5 hours to 3 hours under reduced pressure using steam in order to remove the unreacted raw materials below a predetermined amount level. A temperature of a reaction solution was cooled to about 90° C. to perform a neutralization treatment using an alkaline solution. In addition, washing may also be performed and thereafter, water was removed by dehydrating the reaction solution. Filter media were introduced into the dehydrated reaction solution and stirred for a predetermined time. Then, the solution was filtered to finally obtain 1,326.7 g (yield: 99.0%) of di-2-ethylhexyl terephthalate.

Preparation Example 2: Preparation of DINTP

DINTP was prepared in the same manner as in Preparation Example 1 except that isononyl alcohol was used instead of using 2-ethylhexyl alcohol during the esterification reaction.

Preparation Example 3: Preparation of DOTP/BOTP/DBTP Mixture (First Mixture) (GL 500)

2,000 g of dioctyl terephthalate obtained in Preparation Example 1 and 340 g of n-butanol (17 parts by weight based on 100 parts by weight of the DOTP) were introduced into a reactor equipped with a stirrer, a condenser, and a decanter, and a transesterification reaction was carried out at a reaction temperature of 160° C. for 2 hours under a nitrogen atmosphere to obtain an ester plasticizer composition including 4.0 wt % of dibutyl terephthalate (DBTP), 35.0 wt % of butylisononyl terephthalate (BINTP), and 61.0 wt % of diisononyl terephthalate (DINTP).

Mixed distillation of the reaction product was conducted to remove butanol and 2-ethylhexyl alcohol and to finally prepare a first mixture.

Aration Example 4: Preparation of DINTP/OINTP/DOTP Mixture (Third Mixture) (GL 100)

498.0 g of purified terephthalic acid (TPA), 975 g of 2-ethylhexyl alcohol (2-EH) (molar ratio of TPA:2-EH=1.0:2.5), 216.5 g of isononyl alcohol (INA) (molar ratio of TPA:INA=1.0:0.5), and a titanium-based catalyst (tetra isopropyl titanate, TIPT) as a catalyst were put in a 3 liter, four-neck reactor equipped with a cooler, a condenser, a decanter, a reflux pump, a temperature controller, and a stirrer, and the temperature was slowly increased to about 170° C. The generation of water was initiated at about 170° C., and an esterification reaction was conducted for about 4.5 hours while continuously introducing nitrogen gas at a reaction temperature of about 220° C. under an atmospheric pressure condition. The reaction was terminated when an acid value reached 0.01.

After the completion of the reaction, distillation extraction was performed for 0.5 hours to 4 hours under reduced pressure in order to remove unreacted raw materials. Steam extraction was performed for 0.5 hours to 3 hours under reduced pressure using steam in order to remove the unreacted raw materials below a predetermined amount level. A temperature of a reaction solution was cooled to about 90° C. to perform a neutralization treatment using an alkaline solution. In addition, washing may also be performed and thereafter, water was removed by dehydrating the reaction solution. Filter media were introduced into the dehydrated reaction solution and stirred for a predetermined time. Then, the solution was filtered to finally obtain a third mixture.

Preparation Example 5: Preparation of TBC 706 g (yield: 98%) of tributyl citrate was finally obtained by using 384 g of citric acid and 580 g of butanol as reaction raw materials.

Preparation Example 6: Preparation of TOC 1,029 g (yield: 98%) of tri-2-ethylhexyl citrate was finally obtained by using 384 g of citric acid and 1,014 g of 2-ethylhexanol as reaction raw materials.

Preparation Example 7: Preparation of TPC 796 g (yield: 98%) of tripentyl citrate was finally obtained by using 384 g of citric acid and 688 g of 1-pentanol as reaction raw materials.

Preparation Example 8: Preparation of THC 878 g (yield: 98%) of trihexyl citrate was finally obtained by using 384 g of citric acid and 797 g of n-hexanol as reaction raw materials.

Preparation Example 9: Preparation of TiBC 706 g (yield: 98%) of triisobutyl citrate was finally obtained by using 384 g of citric acid and 580 g of isobutanol as reaction raw materials.

Preparation Example 10: Preparation of TiNC 1,111 g (yield: 98%) of triisononyl citrate was finally obtained by using 384 g of citric acid and 1,123 g of isononanol as reaction raw materials.

Preparation Example 11: Preparation of BOC-A

A transesterification reaction was carried out by using 1,000 g of the TOC prepared in Preparation Example 6 and 300 g of n-butanol as reaction raw materials, and 840 g of butyloctyl citrate was finally obtained. For reference, the product is a composition, wherein main components are BOC bonded to two butyl groups, BOC bonded to one butyl group, and TOC not bonded to a butyl group, which were categorized by the alkyl group bonded to three ester groups of the citrate compound, and weight ratios of the main components were about 20%, 50%, and 30%, respectively.

Preparation Example 12: Preparation of BOC-B

A transesterification reaction was carried out by using 1,000 g of the TOC prepared in Preparation Example 6 and 150 g of n-butanol as reaction raw materials, and 940 g of butyloctyl citrate was finally obtained. For reference, the product is a composition, wherein main components are BOC bonded to two butyl groups, BOC bonded to one butyl group, and TOC not bonded to a butyl group, which were categorized by the alkyl group bonded to three ester groups of the citrate compound, and weight ratios of the main components were about 10%, 40%, and 50%, respectively.

Plasticizer compositions of Examples 1 to 17 were prepared by mixing the materials prepared in Preparation Examples 1 to 12, and the compositions are summarized in the following Tables 1 to 5. Physical properties of the plasticizer compositions were evaluated according to the following test items.

TABLE 1

| | Terephthalate-based material | Citrate-based material | Mixing weight ratio |
|---|---|---|---|
| Example 1-1 | Preparation Example 1 (DOTP) | Preparation Example 5 (TBC) | 95:5 |
| Example 1-2 | | | 7:3 |
| Example 1-3 | | | 5:5 |
| Example 1-4 | | | 3:7 |
| Example 1-5 | | | 1:9 |
| Example 2-1 | | Preparation Example 6 (TOC) | 95:5 |
| Example 2-2 | | | 7:3 |
| Example 2-3 | | | 5:5 |
| Example 2-4 | | | 3:7 |
| Example 2-5 | | | 1:9 |
| Example 3-1 | | Preparation Example 7 (TPC) | 9:1 |
| Example 3-2 | | | 7:3 |
| Example 3-3 | | | 5:5 |
| Example 4-1 | | Preparation Example 8 (THC) | 9:1 |
| Example 4-2 | | | 7:3 |
| Example 4-3 | | | 5:5 |
| Example 5-1 | | Preparation Example 9 (TiBC) | 8:2 |
| Example 5-2 | | | 6:4 |
| Example 5-3 | | | 4:6 |
| Example 5-4 | | | 2:8 |
| Example 6-1 | | Preparation Example 10 (TiNC) | 9:1 |
| Example 6-2 | | | 7:3 |
| Example 6-3 | | | 5:5 |
| Example 6-4 | | | 3:7 |
| Example 6-5 | | | 1:9 |
| Example 7-1 | | Preparation Example 11 (BOC-A) | 85:15 |
| Example 7-2 | | | 7:3 |
| Example 7-3 | | | 6:4 |
| Example 8-1 | | Preparation Example 12 (BOC-B) | 85:15 |
| Example 8-2 | | | 7:3 |
| Example 8-3 | | | 6:4 |

TABLE 2

| | Terephthalate-based material | Citrate-based material | Mixing weight ratio |
|---|---|---|---|
| Example 9-1 | Preparation Example 2 (DINTP) | Preparation Example 5 (TBC) | 8:2 |
| Example 9-2 | | | 6:4 |
| Example 9-3 | | | 4:6 |
| Example 9-4 | | | 2:8 |
| Example 10-1 | | Preparation Example 6 (TOC) | 8:2 |
| Example 10-2 | | | 6:4 |
| Example 10-3 | | | 4:6 |
| Example 10-4 | | | 2:8 |
| Example 11-1 | | Preparation Example 9 (TiBC) | 8:2 |
| Example 11-2 | | | 6:4 |
| Example 11-3 | | | 4:6 |
| Example 11-4 | | | 2:8 |

TABLE 3

| | Terephthalate-based material | Citrate-based material | Mixing weight ratio |
|---|---|---|---|
| Example 12-1 | Preparation Example 3 | Preparation Example 11 (BOC-A) | 85:15 |
| Example 12-2 | | | 7:3 |
| Example 12-3 | | | 6:4 |
| Example 13-1 | | Preparation Example 12 (BOC-B) | 85:15 |
| Example 13-2 | | | 7:3 |
| Example 13-3 | | | 6:4 |

TABLE 4

| | Terephthalate-based material | Citrate-based material | Mixing weight ratio |
|---|---|---|---|
| Example 14-1 | Preparation Example 4 | Preparation Example 5 (TBC) | 95:5 |
| Example 14-2 | | | 7:3 |
| Example 14-3 | | | 5:5 |
| Example 14-4 | | | 1:9 |
| Example 15-1 | | Preparation Example 6 (TOC) | 7:3 |

TABLE 5

| | Terephthalate-based material | Citrate-based material | Epoxidized oil | Mixing weight ratio |
|---|---|---|---|---|
| Example 16-1 | Preparation Example 1 (DOTP) | Preparation Example 5 (TBC) | ESO | (3:5):2 |
| Example 16-2 | | | | (6:3):1 |
| Example 16-3 | | | | (6:2):2 |
| Example 16-4 | | | | (5:3):2 |
| Example 16-5 | | | | (4:4):2 |
| Example 17-1 | | Preparation Example 6 (TOC) | | (3:3):4 |
| Example 17-2 | | | | (4:3):3 |
| Example 17-3 | | | | (5:3):2 |

<Test Items>
Hardness Measurement
Shore hardness (3 T, 10 s) was measured at 25° C. in accordance with ASTM D2240.
Tensile Strength Measurement
A breaking point of a specimen was measured after pulling the specimen at a cross-head speed of 200 mm/min (1 T) using a test instrument, U.T.M (4466, Instron) by the method of ASTM D638. The tensile strength was calculated as follows.

Tensile strength (kgf/mm$^2$)=load value (kgf)/(thickness (mm)×width (mm))

Elongation Rate Measurement

A breaking point of a specimen was measured after pulling the specimen at a cross-head speed of 200 mm/min (1 T) using the U.T.M by the method of ASTM D638, and the elongation rate was calculated as follows.

Elongation rate (%)=[length after elongation/initial length]×100

Migration Loss Measurement

A specimen having a thickness of 2 mm or more was obtained in accordance with KSM-3156. PS plates were respectively attached on both sides of the specimen, and the weight of 1 kgf/cm$^2$ was then applied thereto. The specimen was left standing for 72 hours in a hot air circulating oven (80° C.), and cooled at room temperature for 4 hours. Thereafter, the PS plates attached to the both sides of the specimen were removed. Then, weights of the specimen before and after being left standing in the oven were measured, and migration loss was calculated by the following equation.

Migration loss (%)=[(initial weight of a specimen at room temperature−weight of the specimen after being left standing in an oven)/initial weight of the specimen at room temperature]×100

Volatile Loss Measurement

The specimen thus prepared was heated at 80° C. for 72 hours, and the weight of the specimen was measured.

Volatile Loss (%)=[(initial weight of a specimen−weight of the specimen after heating)/initial weight of the specimen]×100

Stress Test

After the specimen, in a state of being bent, was left standing for a predetermined time at room temperature, degree of migration was observed and the degree was expressed as a numerical value. Characteristics were better as the value was closer to 0.

Light Resistance Measurement

A specimen was mounted on an accelerated weathering (QUV) apparatus and irradiated with ultraviolet (UV) light for 200 hours by the method of ASTM 4329-13, and changes in color were then calculated by using a reflectometer.

Heat Resistance Measurement

A degree of discoloration of the initial specimen according to the volatile loss measurement method and the specimen after the volatile loss test was measured. The measurement value was determined by changes in E value with respect to L,a,b values using a colorimeter.

Experimental Example 1: DOTP-Based Plasticizer Compositions

1. Mixed Plasticizer Composition of DOTP and TBC

DOTP and TBC were mixed in mixing ratios of Examples 1-1 to 1-5 listed in Table 1 to obtain mixed plasticizer compositions, and the compositions were used as experimental specimens.

With reference to ASTM D638, the specimens were prepared in such a manner that 40 parts by weight of the mixed plasticizer composition, 2.5 parts by weight of an auxiliary stabilizer (ESO), and 3 parts by weight of a stabilizer (LOX-430) were mixed with 100 parts by weight of PVC in a 3 L super mixer at 700 rpm and a temperature of 98° C., a 5 mm thick sheet was prepared by using a roll mill at 160° C. for 4 minutes, and a sheet having a thickness of 1 mm to 3 mm was then prepared by low-pressure pressing for 2.5 minutes and high-pressure pressing for 2 minutes at a temperature of 180° C. Physical properties of each specimen were evaluated for the above-described test items, and the results thereof are summarized in Table 6 below.

TABLE 6

| | Plasticizer | Hardness (Shore "A") | Tensile strength (Kg/cm$^2$) | Elongation rate (%) | Migration loss (%) | Volatile loss (%) | Light resistance (E) | Absorption time (sec) | Stress test (24 hrs) |
|---|---|---|---|---|---|---|---|---|---|
| Example 1-1 | 95:5 | 86.5 | 222.6 | 321.7 | 0.20 | 2.32 | 2.14 | 392 | 0.5 |
| Example 1-2 | 7:3 | 86.0 | 221.3 | 315.5 | 0.23 | 2.88 | 1.76 | 372 | 0.5 |
| Example 1-3 | 5:5 | 84.8 | 216.5 | 313.2 | 0.24 | 2.90 | 1.35 | 341 | 0.5 |
| Example 1-4 | 3:7 | 83.9 | 198.3 | 280.2 | 2.21 | 11.01 | 1.22 | 235 | 0.5 |
| Example 1-5 | 1:9 | 83.1 | 190.3 | 278.5 | 2.45 | 12.31 | 1.19 | 214 | 0.5 |
| Comparative Example 1 | DOP | 88.2 | 203.4 | 289.6 | 3.56 | 6.64 | 1.13 | 408 | 1.0 |
| Comparative Example 2 | DOTP | 89.4 | 222.1 | 324.9 | 0.25 | 2.75 | 2.71 | 465 | 3.0 |

As illustrated in Table 6, when Examples 1-1 to 1-5 and Comparative Examples 1 and 2 using DOP and DOTP plasticizers, as commercial products widely sold, were compared, it may be confirmed that Examples 1-1 to 1-5 had all physical properties, such as hardness, absorption time, tensile strength, elongation rate, stress resistance, and migration, equal to or better than Comparative Examples 1 and 2. Furthermore, it may be understood that Examples 1-1 to 1-5 improved poor physical properties of the conventional plasticizer products.

In a case in which the absorption time of the plasticizer was short, processability may be improved. However, since limitations due to gelling may occur during processing even in the case that the absorption time is excessively short, an appropriate absorption time may need to be maintained. From this point of view, with respect to Examples 1-4 and 1-5 in which an excessive amount of TBC was mixed, the absorption time seemed to be relatively short, and thus, there is a possibility that the limitations due to gelling may occur during processing when the plasticizer composition was used. However, with respect to Examples 1-1 to 1-3 in which the amount of TBC was appropriately adjusted, since absorption was performed for an appropriate period of time, it was confirmed that the limitations did not occur. Furthermore, it may be confirmed that a difference in the physical properties, such as volatile loss, was large according to the adjustment of the mixing ratio. Thus, it may be understood that a better plasticizer composition may be obtained when the mixing ratio was appropriately adjusted.

2. Mixed Plasticizer Composition of DOTP and TOC

DOTP and TOC were mixed in mixing ratios of Examples 2-1 to 2-5 listed in Table 1 to obtain mixed plasticizer compositions, and the compositions were used as experimental specimens. The preparation of the specimens and physical property evaluation were performed in the same manner as in [1. Mixed Plasticizer Composition of DOTP and TBC], and the results thereof are presented in Table 7 below.

TABLE 7

| | Plasticizer | Hardness (Shore "A") | Tensile strength (Kg/cm$^2$) | Elongation rate (%) | Migration loss (%) | Volatile loss (%) | Light resistance (E) | Absorption time (sec) | Stress test (24 hrs) |
|---|---|---|---|---|---|---|---|---|---|
| Example 2-1 | 95:5 | 89.4 | 230.8 | 326.8 | 0.15 | 0.77 | 2.23 | 450 | 0.5 |
| Example 2-2 | 7:3 | 89.5 | 231.6 | 328.1 | 0.13 | 0.60 | 1.90 | 475 | 0 |
| Example 2-3 | 5:5 | 89.7 | 235.9 | 332.5 | 0.10 | 0.32 | 1.45 | 482 | 0 |
| Example 2-4 | 3:7 | 91.2 | 235.5 | 340.2 | 0.11 | 0.31 | 1.33 | 586 | 0 |
| Example 2-5 | 1:9 | 91.6 | 237.0 | 342.1 | 0.10 | 0.28 | 1.18 | 604 | 0 |
| Comparative Example 1 | DOP | 88.4 | 205.8 | 282.3 | 3.77 | 6.80 | 1.13 | 420 | 1.0 |
| Comparative Example 2 | DOTP | 89.4 | 226.0 | 320.0 | 0.23 | 2.05 | 2.71 | 445 | 3.0 |

As illustrated in Table 7, when Examples 2-1 to 2-5 and Comparative Examples 1 and 2 using DOP and DOTP plasticizers, as commercial products widely sold, were compared, it may be confirmed that Examples 2-1 to 2-5 had all physical properties equal to or better than the conventional DOTP product. Furthermore, it may be understood that Examples 2-1 to 2-5 improved poor physical properties of the conventional plasticizer products.

With respect to the absorption time, it may be understood that Examples 2-1 to 2-3 had an appropriate absorption time, but Examples 2-4 and 2-5 required a relatively long absorption time. Since this may cause the deterioration of processability and productivity, it may also be confirmed that, in some cases, it needs to be careful when an excessive amount of TOC was mixed.

3. Mixed Plasticizer Composition of DOTP and TPC

DOTP and tripentyl citrate (TPC) or triamyl citrate were mixed in mixing ratios of Examples 3-1 to 3-3 listed in Table 1 to obtain mixed plasticizer compositions, and the compositions were used as experimental specimens. The specimens were prepared in the same manner as in [1. Mixed Plasticizer Composition of DOTP and TBC] except that a stabilizer, BZ153T, was used during the formulation of the sheet, physical properties were similarly evaluated, and the results thereof are presented in Table 8 below.

TABLE 8

| | Plasticizer | Hardness (Shore "A") | Tensile strength (Kg/cm$^2$) | Elongation rate (%) | Migration loss (%) | Volatile loss (%) | Light resistance (E) | Stress test (7 days) |
|---|---|---|---|---|---|---|---|---|
| Example 3-1 | 9:1 | 90.6 | 225.3 | 326.1 | 1.57 | 0.70 | 2.30 | 1.0 |
| Example 3-2 | 7:3 | 89.8 | 223.4 | 324.9 | 1.37 | 0.92 | 1.68 | 0 |
| Example 3-3 | 5:5 | 88.7 | 220.0 | 320.4 | 1.09 | 1.08 | 1.12 | 0 |
| Comparative Example 1 | DOP | 88.4 | 205.8 | 282.3 | 3.77 | 6.80 | 1.13 | 1.0 |
| Comparative Example 2 | DOTP | 91.8 | 226.3 | 318.2 | 1.65 | 0.76 | 2.56 | 2.0 |

As illustrated in Table 8, when Examples 3-1 to 3-3 and Comparative Examples 1 and 2 using DOP and DOTP plasticizers, as commercial products widely sold, were compared, it may be confirmed that Examples 3-1 to 3-3 had all physical properties equal to or better than the conventional DOTP product. Furthermore, it may be understood that Examples 3-1 to 3-3 improved poor physical properties of the conventional plasticizer products.

4. Mixed Plasticizer Composition of DOTP and THC

DOTP and trihexyl citrate (THC) were mixed in mixing ratios of Examples 4-1 to 4-3 listed in Table 1 to obtain mixed plasticizer compositions, and the compositions were used as experimental specimens. The specimens were prepared in the same manner as in [1. Mixed Plasticizer Composition of DOTP and TBC] except that a stabilizer, BZ153T, was used during the formulation of the sheet, physical properties were similarly evaluated, and the results thereof are presented in Table 9 below.

TABLE 9

| | Plasticizer | Hardness (Shore "A") | Tensile strength (Kg/cm$^2$) | Elongation rate (%) | Migration loss (%) | Volatile loss (%) | Light resistance (E) | Stress test (7 days) |
|---|---|---|---|---|---|---|---|---|
| Example 4-1 | 9:1 | 91.1 | 221.9 | 319.8 | 0.98 | 0.69 | 2.35 | 1.0 |
| Example 4-2 | 7:3 | 90.4 | 217.4 | 315.1 | 0.75 | 0.74 | 1.77 | 1.0 |
| Example 4-3 | 5:5 | 89.9 | 210.6 | 311.5 | 0.62 | 0.73 | 1.23 | 0.5 |

TABLE 9-continued

|  | Plasticizer | Hardness (Shore "A") | Tensile strength (Kg/cm²) | Elongation rate (%) | Migration loss (%) | Volatile loss (%) | Light resistance (E) | Stress test (7 days) |
|---|---|---|---|---|---|---|---|---|
| Comparative Example 1 | DOP | 88.4 | 205.8 | 282.3 | 3.77 | 6.80 | 1.13 | 1.0 |
| Comparative Example 2 | DOTP | 91.8 | 226.3 | 318.2 | 1.65 | 0.76 | 2.56 | 2.0 |

As illustrated in Table 9, when Examples 4-1 to 4-3 and Comparative Examples 1 and 2 using DOP and DOTP plasticizers, as commercial products widely sold, were compared, it may be confirmed that Examples 4-1 to 4-3 had all physical properties equal to or better than the conventional DOTP product. Furthermore, it may be understood that Examples 4-1 to 4-3 improved poor physical properties of the conventional plasticizer products.

5. Mixed Plasticizer Composition of DOTP and TiBC

DOTP and triisobutyl citrate (TiBC) were mixed in mixing ratios of Examples 5-1 to 5-4 listed in Table 1 to obtain mixed plasticizer compositions, and the compositions were used as experimental specimens. The preparation of the specimens and physical property evaluation were performed in the same manner as in [1. Mixed Plasticizer Composition of DOTP and TBC] except that the working temperature during the evaluation of the volatile loss was set to 100° C., and the results thereof are presented in Table 10 below.

TABLE 10

|  | Plasticizer | Hardness (Shore "A") | Tensile strength (Kg/cm²) | Elongation rate (%) | Migration loss (%) | Volatile loss (%) |
|---|---|---|---|---|---|---|
| Example 5-1 | 8:2 | 86.0 | 228.6 | 311.2 | 0.82 | 2.35 |
| Example 5-2 | 6:4 | 85.4 | 221.3 | 308.5 | 1.02 | 4.62 |
| Example 5-3 | 4:6 | 84.0 | 217.9 | 302.5 | 1.37 | 6.88 |
| Example 5-4 | 2:8 | 83.0 | 211.6 | 294.6 | 1.88 | 7.85 |
| Comparative Example 2 | DOTP | 89.6 | 230.7 | 315.7 | 0.70 | 0.84 |
| Comparative Example 3 | TiBC | 82.5 | 200.3 | 282.5 | 3.56 | 11.57 |

As illustrated in Table 10, when Examples 5-1 to 5-4 and Comparative Example 2 using a DOTP plasticizer, as a commercial product widely sold, were compared, it may be confirmed that Examples 5-1 to 5-4 had all physical properties equal to or better than the conventional DOTP product. Furthermore, it may be understood that Examples 5-1 to 5-4 improved poor physical properties of the conventional plasticizer product.

With respect to Examples 5-3 and 5-4 in which a relatively excessive amount of TiBC was included in comparison to Examples 5-1 and 5-2, it may be confirmed that tensile strength and elongation rate were reduced and migration loss and volatile loss were significantly reduced. That is, it may also be confirmed that, in some cases, it needs to be careful when an excessive amount of TiBC was mixed.

6. Mixed Plasticizer Composition of DOTP and TiNC

DOTP and triisononyl citrate (TiNC) were mixed in mixing ratios of Examples 6-1 to 6-5 listed in Table 1 to obtain mixed plasticizer compositions, and the compositions were used as experimental specimens. The specimens were prepared in the same manner as in [1. Mixed Plasticizer Composition of DOTP and TBC] except that a stabilizer, BZ153T, was used during the formulation of the sheet, physical properties were similarly evaluated, and the results thereof are presented in Table 11 below.

TABLE 11

|  | Plasticizer | Hardness (Shore "A") | Tensile strength (Kg/cm²) | Elongation rate (%) | Migration loss (%) | Volatile loss (%) | Light resistance (E) |
|---|---|---|---|---|---|---|---|
| Example 6-1 | 9:1 | 92.2 | 238.0 | 326.9 | 1.04 | 0.56 | 1.95 |
| Example 6-2 | 7:3 | 92.5 | 244.8 | 335.5 | 0.85 | 0.48 | 1.68 |
| Example 6-3 | 5:5 | 92.8 | 249.2 | 346.6 | 0.62 | 0.42 | 1.39 |

TABLE 11-continued

|  | Plasticizer | Hardness (Shore "A") | Tensile strength (Kg/cm²) | Elongation rate (%) | Migration loss (%) | Volatile loss (%) | Light resistance (E) |
|---|---|---|---|---|---|---|---|
| Example 6-4 | 3:7 | 94.1 | 257.5 | 360.3 | 0.54 | 0.50 | 1.02 |
| Example 6-5 | 1:9 | 94.8 | 261.4 | 369.3 | 0.58 | 0.43 | 0.88 |
| Comparative Example 2 | DOTP | 92.0 | 227.5 | 315.1 | 1.51 | 0.79 | 2.71 |

As illustrated in Table 11, when Examples 6-1 to 6-4 and Comparative Example 2 using a DOTP plasticizer, as a commercial product widely sold, were compared, it may be confirmed that Examples 6-1 to 6-4 had all physical properties equal to or better than the conventional DOTP product. Furthermore, it may be understood that Examples 6-1 to 6-4 improved poor physical properties of the conventional plasticizer product.

With respect to Examples 6-3 and 6-4 in which a relatively excessive amount of TiNC was included in comparison to Examples 6-1 and 6-2, it may be confirmed that plasticizing efficiency was reduced as hardness was significantly increased. That is, it may also be confirmed that, in some cases, it needs to be careful when an excessive amount of TiNC was mixed.

7. Mixed Plasticizer Composition of DOTP and BOC

DOTP and butyloctyl citrate (BOC) were mixed in mixing ratios of Examples 7-1 to 7-3 (BOC-A) and Examples 8-1 to 8-3 (BOC-B) listed in Table 1 to obtain mixed plasticizer compositions, and the compositions were used as experimental specimens. The specimens were prepared in the same manner as in [1. Mixed Plasticizer Composition of DOTP and TBC] except that a stabilizer, BZ153T, was used during the formulation of the sheet, physical properties were similarly evaluated, and the results thereof are presented in Table 12 below.

TABLE 12

|  | Plasticizer | Hardness (Shore "A") | Tensile strength (Kg/cm²) | Elongation rate (%) | Migration loss (%) | Volatile loss (%) |
|---|---|---|---|---|---|---|
| Example 7-1 | 85:15 | 88.3 | 228.0 | 334.7 | 0.22 | 0.85 |
| Example 7-2 | 7:3 | 88.0 | 222.6 | 331.6 | 0.18 | 0.42 |
| Example 7-3 | 6:4 | 87.9 | 225.5 | 336.4 | 0.15 | 0.35 |
| Example 8-1 | 85:15 | 88.2 | 222.8 | 332.7 | 0.20 | 0.59 |
| Example 8-2 | 7:3 | 88.7 | 225.8 | 338.6 | 0.16 | 0.46 |
| Example 8-3 | 6:4 | 89.8 | 229.7 | 339.4 | 0.12 | 0.32 |
| Comparative Example 2 | DOTP | 89.5 | 228.8 | 318.1 | 0.24 | 1.08 |

As illustrated in Table 12, when Examples 7-1 to 7-3, Examples 8-1 to 8-3, and Comparative Example 2 using a DOTP plasticizer, as a commercial product widely sold, were compared, it may be confirmed that Examples 7-1 to 7-3 and Examples 8-1 to 8-3 had all physical properties equal to or better than the conventional DOTP product. In particular, it may be understood that elongation rate and volatile loss characteristics were significantly improved.

Experimental Example 2: DINTP-Based Plasticizer Compositions

1. Mixed Plasticizer Composition of DINTP and TBC

DINTP and tributyl citrate (TBC) were mixed in mixing ratios of Examples 9-1 to 9-4 listed in Table 2 to obtain mixed plasticizer compositions, and the compositions were used as experimental specimens. The specimens were prepared in the same manner as in [1. Mixed Plasticizer Composition of DOTP and TBC] except that a stabilizer, BZ153T, was used during the formulation of the sheet, physical properties were similarly evaluated, and the results thereof are presented in Table 13 below.

TABLE 13

|  | Plasticizer | Hardness (Shore "A") | Tensile strength (Kg/cm$^2$) | Elongation rate (%) | Migration loss (%) | Volatile loss (%) | Light resistance (E) | Stress test (24 hrs) |
|---|---|---|---|---|---|---|---|---|
| Example 9-1 | 8:2 | 91.0 | 232.1 | 342.0 | 2.38 | 1.03 | 1.74 | 1.5 |
| Example 9-2 | 6:4 | 89.3 | 232.8 | 335.7 | 2.30 | 1.23 | 1.56 | 1.0 |
| Example 9-3 | 4:6 | 87.7 | 225.0 | 316.2 | 2.30 | 1.88 | 1.31 | 0.5 |
| Example 9-4 | 2:8 | 87.0 | 215.3 | 317.2 | 2.39 | 2.56 | 1.30 | 0.5 |
| Comparative Example 4 | DINTP | 92.7 | 230.2 | 314.4 | 2.72 | 0.89 | 3.56 | 2.5 |
| Comparative Example 5 | TBC | 86.3 | 202.4 | 301.4 | 6.99 | 15.38 | 1.33 | 0 |

As illustrated in Table 13, when Examples 9-1 to 9-4, Comparative Example 4 using a DINTP plasticizer, as a commercial product widely sold, and Comparative Example 5, in which a terephthalate-based material was not included, were compared, it may be confirmed that Examples 9-1 to 9-4 had all physical properties equal to or better than the conventional DINTP product. Furthermore, it may be understood that Examples 9-1 to 9-4 improved poor physical properties of the conventional plasticizer products.

With respect to Examples 9-3 and 9-4 in which a relatively excessive amount of TBC was included in comparison to Examples 9-1 and 9-2, it may be confirmed that effects of improving tensile strength and elongation rate were insignificant. That is, it may also be confirmed that, in some cases, it needs to be careful when an excessive amount of TBC was mixed.

2. Mixed Plasticizer Composition of DINTP and TOC

DINTP and trioctyl citrate (TOC) were mixed in mixing ratios of Examples 10-1 to 10-4 listed in Table 2 to obtain mixed plasticizer compositions, and the compositions were used as experimental specimens. The specimens were prepared in the same manner as in [1. Mixed Plasticizer Composition of DOTP and TBC] except that a stabilizer, BZ153T, was used during the formulation of the sheet and the working temperature during the evaluation of the volatile loss was set to 100° C., and the results thereof are presented in Table 14 below.

TABLE 14

|  | Plasticizer | Hardness (Shore "A") | Tensile strength (Kg/cm$^2$) | Elongation rate (%) | Migration loss (%) | Volatile loss (%) | Light resistance (E) | Stress test (24 hrs) |
|---|---|---|---|---|---|---|---|---|
| Example 10-1 | 8:2 | 92.0 | 231.9 | 374.5 | 1.82 | 0.83 | 1.89 | 1.5 |
| Example 10-2 | 6:4 | 91.7 | 229.8 | 369.9 | 1.61 | 0.81 | 1.75 | 1.0 |
| Example 10-3 | 4:6 | 91.5 | 228.1 | 370.3 | 1.41 | 0.80 | 1.45 | 0.5 |
| Example 10-4 | 2:8 | 91.3 | 230.2 | 373.4 | 1.24 | 0.81 | 1.46 | 0.5 |
| Comparative Example 4 | DINTP | 92.3 | 217.0 | 341.3 | 2.82 | 1.36 | 3.56 | 2.0 |
| Comparative Example 6 | TOC | 91.3 | 230.1 | 369.0 | 0.82 | 0.82 | 1.35 | 0.5 |

As illustrated in Table 14, when Examples 10-1 to 10-4, Comparative Example 4 using a DINTP plasticizer, as a commercial product widely sold, and Comparative Example 6, in which a terephthalate-based material was not included, were compared, it may be confirmed that Examples 10-1 to 10-4 had all physical properties equal to or better than the conventional DINTP product. Furthermore, it may be understood that Examples 10-1 to 10-4 improved poor physical properties of the conventional plasticizer product.

3. Mixed Plasticizer Composition of DINTP and TiBC

DINTP and triisobutyl citrate (TiBC) were mixed in mixing ratios of Examples 11-1 to 11-4 listed in Table 2 to obtain mixed plasticizer compositions, and the compositions were used as experimental specimens. The specimens were prepared in the same manner as in [1. Mixed Plasticizer Composition of DOTP and TBC] except that a stabilizer, BZ153T, was used during the formulation of the sheet and the working temperature during the evaluation of the volatile loss was set to 100° C., and the results thereof are presented in Table 15 below.

TABLE 15

| | Plasticizer | Hardness (Shore "A") | Tensile strength (Kg/cm$^2$) | Elongation rate (%) | Migration loss (%) | Volatile loss (%) | Light resistance (E) |
|---|---|---|---|---|---|---|---|
| Example 11-1 | 8:2 | 90.8 | 236.1 | 348.5 | 2.12 | 1.83 | 1.82 |
| Example 11-2 | 6:4 | 89.5 | 237.5 | 332.8 | 2.00 | 2.11 | 1.46 |
| Example 11-3 | 4:6 | 87.3 | 228.9 | 320.9 | 2.86 | 2.59 | 1.25 |
| Example 11-4 | 2:8 | 87.1 | 221.0 | 315.1 | 3.26 | 3.44 | 1.11 |
| Comparative Example 4 | DINTP | 92.5 | 235.7 | 318.7 | 2.99 | 0.89 | 3.56 |
| Comparative Example 7 | TiBC | 86.0 | 210.3 | 296.7 | 7.56 | 14.23 | 1.09 |

As illustrated in Table 15, when Examples 11-1 to 11-4, Comparative Example 4 using a DINTP plasticizer, as a commercial product widely sold, and Comparative Example 7, in which a terephthalate-based material was not included, were compared, it may be confirmed that Examples 11-1 to 11-4 had all physical properties equal to or better than the conventional DINTP product. Furthermore, it may be understood that Examples 11-1 to 11-4 improved poor physical properties of the conventional plasticizer products.

With respect to Examples 11-3 and 11-4 in which a relatively excessive amount of TIBC was included in comparison to Examples 11-1 and 11-2, it may be confirmed that effects of improving tensile strength and elongation rate characteristics were insignificant. That is, it may also be confirmed that, in some cases, it needs to be careful when an excessive amount of TIBC was mixed.

Experimental Example 3: Mixed Plasticizer Compositions of First Mixture and BOC

The first mixture (DOTP/BOTP/DBTP) of Preparation Example 3 and butyloctyl citrate (BOC) were mixed in mixing ratios of Examples 12-1 to 12-3 (BOC-A) and Examples 13-1 to 13-3 (BOC-B) listed in Table 3 to obtain mixed plasticizer compositions, and the compositions were used as experimental specimens. The specimens were prepared in the same manner as in [1. Mixed Plasticizer Composition of DOTP and TBC] except that 50 parts by weight of the mixed plasticizer composition was added, an auxiliary stabilizer (ESO) was not added, and a stabilizer, BZ153T, was used during the formulation of the sheet, physical properties were similarly evaluated, and the results thereof are presented in Tables 16 and 17 below.

TABLE 16

| | Plasticizer | Hardness (Shore "A") | Tensile strength (Kg/cm²) | Elongation rate (%) | Migration loss (%) | Volatile loss (%) |
|---|---|---|---|---|---|---|
| Example 12-1 | 85:15 | 82.3 | 208.04 | 344.68 | 3.94 | 1.62 |
| Example 12-2 | 7:3 | 81.0 | 202.56 | 341.64 | 3.69 | 1.42 |
| Example 12-3 | 6:4 | 80.9 | 205.51 | 346.35 | 3.21 | 1.28 |
| Example 13-1 | 85:15 | 81.2 | 202.84 | 342.71 | 3.71 | 1.59 |
| Example 13-2 | 7:3 | 81.7 | 205.76 | 348.63 | 3.32 | 1.36 |
| Example 13-3 | 6:4 | 82.8 | 209.66 | 348.12 | 2.90 | 1.19 |
| Comparative Example 8 | First mixture | 81.8 | 212.82 | 349.42 | 4.24 | 1.79 |

TABLE 17

| Stress test | 24 hours | 72 hours | 168 hours |
|---|---|---|---|
| Example 12-1 | 1.0 | 1.5 | 2.0 |
| Example 12-2 | 1.0 | 0.5 | 2.0 |
| Example 12-3 | 0.5 | 1.0 | 1.5 |
| Example 13-1 | 1.0 | 1.5 | 2.0 |
| Example 13-2 | 1.0 | 1.0 | 1.5 |
| Example 13-3 | 1.0 | 1.5 | 1.5 |
| Comparative Example 8 | 1.5 | 2.0 | 2.5 |

As illustrated in Tables 16 and 17, when Examples 12-1 to 12-3, Examples 13-1 to 13-3, and Comparative Example 8 using the mixed plasticizer composition, as a mixed composition of DOTP, BOTP, and DBTP, were compared, it may be confirmed that Examples 12-1 to 12-3 and Examples 13-1 to 13-3 had all physical properties equal to or better than the conventional product.

Experimental Example 4: Mixed Plasticizer Compositions of Third Mixture and TBC or TOC The third mixture (DINTP/OINTP/DOTP) of Preparation Example 4 and tributyl citrate (TBC) or trioctyl citrate (TOC) were mixed in mixing ratios of Examples 14-1 to 14-4 and Example 15-1 listed in Table 4 to obtain mixed plasticizer compositions, and the compositions were used as experimental specimens. The preparation of the specimens and physical property evaluation were performed in the same manner as before, and the results thereof are presented in Tables 18 and 19 below.

TABLE 18

| | Plasticizer | Hardness (Shore "A") | Tensile strength (Kg/cm²) | Elongation rate (%) | Migration loss (%) | Volatile loss (%) | Light resistance (E) |
|---|---|---|---|---|---|---|---|
| Example 14-1 | 95:5 | 92.0 | 254.5 | 308.2 | 1.90 | 0.73 | 3.21 |
| Example 14-2 | 7:3 | 91.1 | 246.0 | 303.6 | 1.71 | 0.85 | 2.85 |
| Example 14-3 | 5:5 | 88.2 | 241.0 | 297.0 | 1.63 | 0.93 | 2.12 |
| Example 14-4 | 1:9 | 86.5 | 216.3 | 264.6 | 1.68 | 2.12 | 2.01 |
| Example 15-1 | 7:3 | 92.5 | 257.5 | 299.3 | 1.48 | 0.65 | 2.94 |
| Comparative Example 2 | DOTP | 91.6 | 246.4 | 296.6 | 1.68 | 0.72 | 5.67 |
| Comparative Example 9 | Third mixture | 92.8 | 254.4 | 309.0 | 2.03 | 0.72 | 5.23 |

TABLE 19

| Stress test | 24 hours | 72 hours | 168 hours |
|---|---|---|---|
| Example 14-1 | 0.5 | 1.5 | 1.5 |
| Example 14-2 | 0 | 0.5 | 1.0 |
| Example 14-3 | 0 | 0.5 | 0 |
| Example 14-4 | 0 | 0 | 0 |
| Example 15-1 | 0.5 | 1.0 | 1.5 |
| Comparative Example 2 | 0.5 | 1.0 | 1.5 |
| Comparative Example 9 | 0.5 | 1.5 | 1.5 |

As illustrated in Tables 18 and 19, when Examples 14-1 to 14-4, Example 15-1, and Comparative Example 9 using the mixed plasticizer composition, as a mixed composition of DINTP, OINTP, and DOTP, were compared, it may be confirmed that Examples 14-1 to 14-4 and Example 15-1 had all physical properties equal to or better than the conventional product.

With respect to Example 14-4 in which a relatively excessive amount of TBC was included in comparison to Examples 14-1 to 14-3, it may be confirmed that tensile strength and elongation rate characteristics were reduced and volatile loss was also poor. That is, it may also be confirmed that, in some cases, it needs to be careful when an excessive amount of TBC was mixed.

Experimental Example 5: Mixed Plasticizer Compositions of DOTP, TBC, and Epoxidized Oil 1. Mixed Plasticizer Composition of DOTP, TBC, and ESO DOTP, TBC, and ESO were mixed in mixing ratios of Examples 16-1 to 16-5 listed in Table 5 to obtain mixed plasticizer compositions, and the compositions were used as experimental specimens. The specimens were prepared in the same manner as in [1. Mixed Plasticizer Composition of DOTP and TBC] except that 30 parts by weight of the mixed plasticizer composition was added, an auxiliary stabilizer (ESO) was not added, and 0.5 part by weight of titanium dioxide ($TiO_2$) was additionally used during the formulation of the sheet, physical properties were similarly evaluated and the results thereof are presented in Table 20 below, and the results of the heat resistance test are presented in FIGS. 1 and 2.

TABLE 20

| | Plasticizer | Hardness (Shore "A") | Tensile strength ($Kg/cm^2$) | Elongation rate (%) | Migration loss (%) | Volatile loss (%) |
|---|---|---|---|---|---|---|
| Example 1-2 | 7:3 | 94.2 | 246.7 | 300.8 | 0.92 | 1.57 |
| Example 16-1 | 3:5:2 | 93.0 | 247.8 | 313.9 | 0.59 | 1.55 |
| Example 16-2 | 6:3:1 | 94.0 | 252.5 | 322.3 | 0.68 | 1.14 |
| Example 16-3 | 6:2:2 | 94.3 | 252.5 | 322.2 | 0.62 | 0.80 |
| Example 16-4 | 5:3:2 | 94.0 | 247.9 | 310.1 | 0.64 | 1.00 |
| Example 16-5 | 4:4:2 | 93.5 | 243.2 | 316.4 | 0.53 | 1.17 |
| Comparative Example 2 | DOTP | 95.5 | 268.5 | 311.0 | 0.78 | 0.61 |

As illustrated in Table 20, when Examples 16-1 to 16-5 and Comparative Example 2, the DOTP plasticizer composition as a conventionally used product, were compared, it may be confirmed that the plasticizer compositions of the examples had properties equal to or better than the conventional product.

Figure 2:
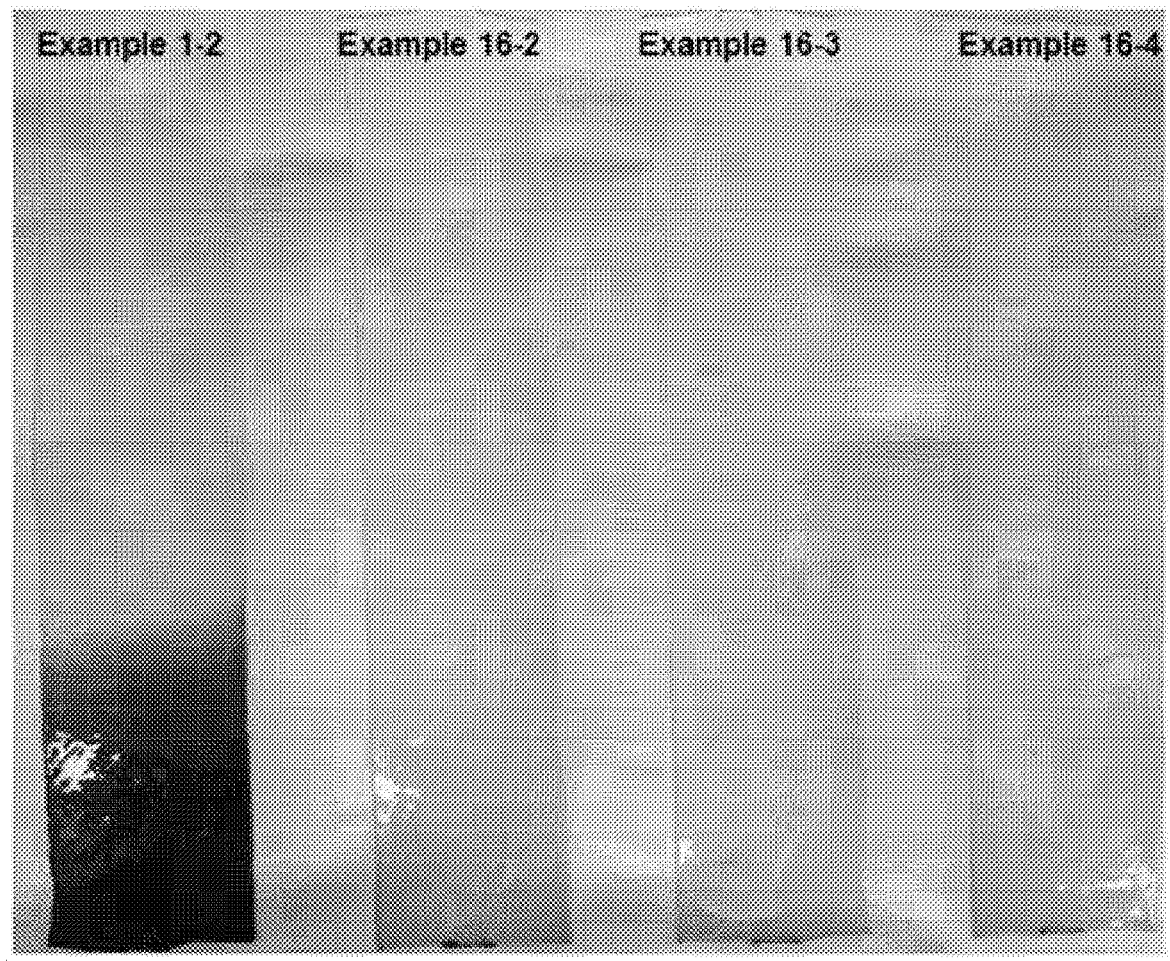
FIG. 2 is an image illustrating the results of heat resistance tests for the resins including the plasticizer compositions according to the present invention.

Referring to images of FIGS. 1 and 2 as the results of the heat resistance test, it may be confirmed that since Example 1-2, in which epoxidized oil was not added, was vulnerable to heat, it was blackened. However, it may be confirmed that there was no change when a predetermined amount of the epoxidized oil was added. That is, in a case in which a Citrate-based material was added to improve physical properties of DOTP as a conventional product, it may be confirmed that heat resistance characteristics may be relatively poor, but even the heat resistance was also maintained and improved when the epoxidized oil was added at the same time.

2. Mixed Plasticizer Composition of DOTP, TOC, and ESO

DOTP, TOC, and ESO were mixed in mixing ratios of Examples 17-1 to 17-3 listed in Table 5 to obtain mixed plasticizer compositions, and the compositions were used as experimental specimens.

With reference to ASTM D638, the specimens were prepared in such a manner that 50 parts by weight of the mixed plasticizer composition, 40 parts by weight of a filler (OMYA1T), 5 parts by weight of a stabilizer (RUP-144), and 0.3 part by weight of a lubricant (St-A) were mixed with 100 parts by weight of PVC in a 3 L super mixer at 700 rpm and a temperature of 98° C., a 5 mm thick sheet was prepared by using a roll mill at 160° C. for 4 minutes, and a sheet having a thickness of 1 mm to 3 mm was then prepared by low-pressure pressing for 2.5 minutes and high-pressure pressing for 2 minutes at a temperature of 180° C.

Physical properties of each specimen were evaluated for the above-described test items, and the specimens were evaluated in the same manner as in [1. Mixed Plasticizer Composition of DOTP and TBC] except that the working temperature was set to 121° C. and the evaluation was carried out for 168 hours during the volatile loss measurement. The following items were additionally evaluated and the results thereof are presented in Tables 21 and 22 below, and the results of the heat resistance test are presented in FIG. 3.

<Additional Test Items>

Residual Tensile Strength

The measurement was performed in the same manner as the above-described tensile strength measurement, and specimens exposed at 121° C. for 168 hours were used.

Residual Elongation

The measurement was performed in the same manner as the above-described elongation rate measurement, and specimens exposed at 121° C. for 168 hours were used.

Low Temperature Resistance

Five prepared specimens were left standing at a specific temperature for 3 minutes and were then hit. The temperature was measured when three out of the five specimens were broken.

TABLE 21

|  | Plasticizer | Hardness (Shore "A") | Tensile strength (Kg/cm$^2$) | Residual tensile strength (%) | Elongation rate (%) | Residual elongation (%) | Migration loss (%) | Volatile loss (%) | Low temperature resistance (° C.) | Heat resistance (E) |
|---|---|---|---|---|---|---|---|---|---|---|
| Example 17-1 | 3:3:4 | 86.8 | 184.3 | 96.4 | 292.6 | 89.5 | 0.48 | 8.63 | −24.0 | 35.53 |
| Example 17-2 | 4:3:3 | 87.0 | 185.3 | 96.5 | 297.8 | 92.5 | 0.63 | 7.04 | −24.5 | 31.46 |
| Example 17-3 | 5:3:2 | 86.8 | 183.0 | 103.7 | 314.8 | 93.9 | 0.91 | 7.06 | −26.0 | 51.13 |
| Comparative Example 10 | DIDP | 87.5 | 175.6 | 94.5 | 317.9 | 91.3 | 0.99 | 8.36 | −25.5 | 49.18 |
| Comparative Example 11 | DINIP | 88.0 | 181.3 | 94.9 | 310.2 | 89.5 | 1.60 | 10.49 | −28.5 | 47.02 |

As illustrated in Table 21, when Examples 17-1 to 17-3 and Comparative Examples 10 and 11, the DIDP and DINIP plasticizer compositions as conventionally used products, were compared, it may be confirmed that the plasticizer compositions of the examples had properties equal to or better than the conventional products. In particular, it may be confirmed that low temperature resistance properties were almost the same as those of the conventional products, but heat resistance properties were significantly improved.

Figure 3:
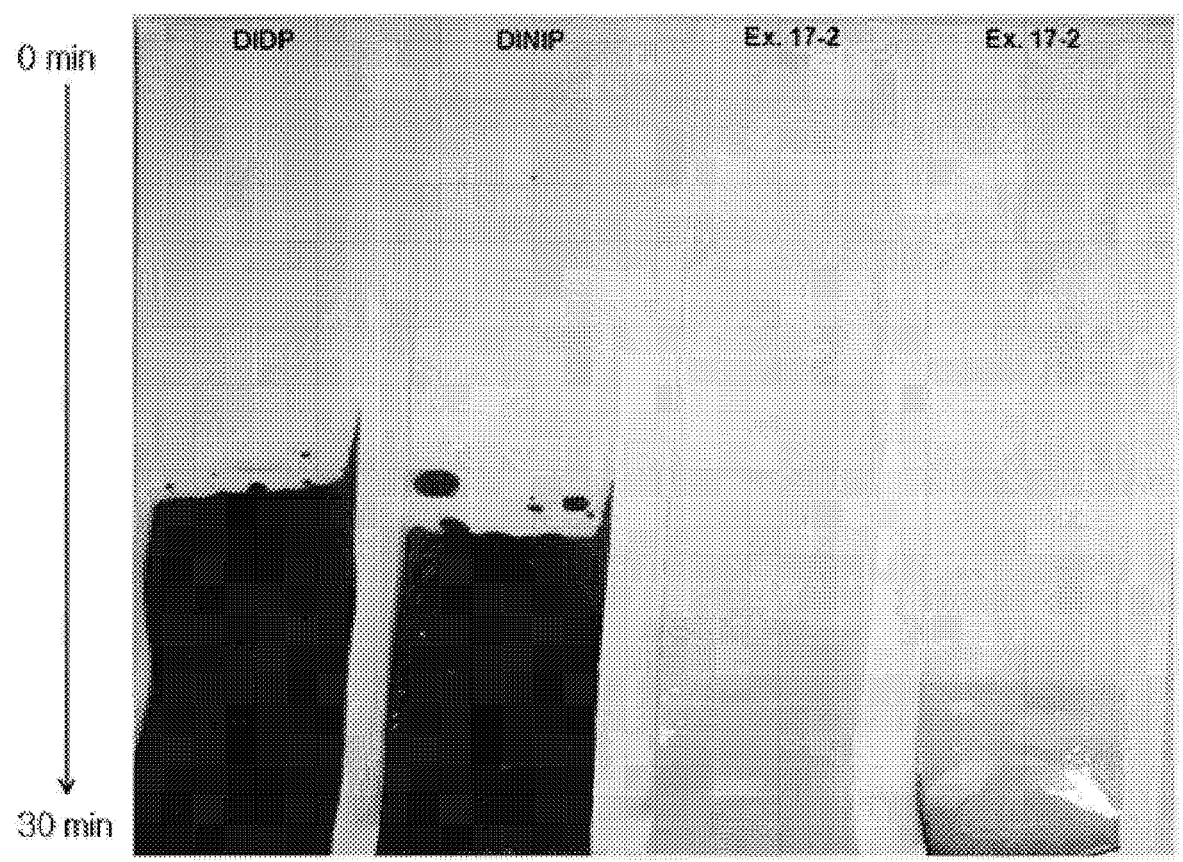
FIG. 3 is an image illustrating the results of thermal stability tests for the resins including the plasticizer compositions according to the present invention.

Referring to an image of FIG. 3 as the results of the thermal stability test, it may be confirmed that since Comparative Examples 10 and 11, as the conventional products, were vulnerable to heat, Comparative Examples 10 and 11 were blackened. However, it may be confirmed that there was no change when a predetermined amount of epoxidized oil was added. That is, in a case in which the epoxidized oil as well as a Citrate-based material was added to improve physical properties of the conventional plasticizer products such as DIDP and DINIP, it was confirmed that even the thermal stability may also be maintained and improved.

Experimental Example 6: Comparison to Acetyl Citrate-Based Material

In order to compare differences in physical properties between a case, in which an acetyl group was included in the Citrate-based material, and a case in which an acetyl group was not included in the Citrate-based material, Examples 1-2, 2-2, and 5-2 and Comparative Example 12, a plasticizer composition in which acetyl 2-ethylhexyl citrate and DOTP were mixed, were used as experimental specimens. The preparation of the specimens and physical property evaluation were performed in the same manner as in [1. Mixed Plasticizer Composition of DOTP and TBC], and the results thereof are presented in Table 22 below.

TABLE 22

|  | Plasticizer | Hardness (Shore "A") | Tensile strength (Kg/cm$^2$) | Elongation rate (%) | Migration loss (%) | Volatile loss (%) |
|---|---|---|---|---|---|---|
| Example 1-2 | DOTP + TBC (70:30) | 86.0 | 221.3 | 315.5 | 0.23 | 2.88 |
| Example 2-2 | DOTP + TOC (70:30) | 89.5 | 231.6 | 328.1 | 0.13 | 0.60 |
| Example 5-2 | DOTP + TiBC (60:40) | 85.4 | 221.3 | 308.5 | 1.02 | 4.62 |
| Comparative Example 12 | DOTP + ATOC (70:30) | 91.2 | 237.9 | 284.6 | 0.25 | 0.54 |

As illustrated in Table 22, in a case in which acetyl 2-ethylhexyl citrate was mixed and used, it may be confirmed that since hardness was significantly increased, plasticizing efficiency, as a physical property highly required for a plasticizer product, may be deteriorated and elongation rate characteristics were also reduced. Accordingly, since economic and process losses may secondarily occur due to the fact that more plasticizer was needed in comparison to other products, it may be understood that, in some cases, it may adversely affect the quality of the product according to the presence of the acetyl group.

Although the exemplary embodiments of the present invention have been described in detail, the scope of the present invention is not limited thereto but various modifications and improvements made by those skilled in the art using the basic concept of the present invention defined in the claims also fall within the scope of the present invention.

The invention claimed is:

1. A plasticizer composition comprising:
    a terephthalate-based material, which is diisononyl terephthalate; and
    a citrate-based material,
    wherein a weight ratio of the terephthalate-based material to the citrate-based material is in a range of 95:5 to 50:50, and
    wherein the citrate-based material is at least one selected from the group consisting of 1,2-dibutyl 3-(2-ethylhexyl) 2-hydroxypropane-1,2,3-tricarboxylate, 1,3-dibutyl 2-(2-ethylhexyl) 2-hydroxypropane-1,2,3-tricarboxylate, 1-butyl 2,3-bis(2-ethylhexyl) 2-hydroxypropane-1,2,3-tricarboxylate, 2-butyl 1,3-bis(2-ethylhexyl) 2-hydroxypropane-1,2,3-tricarboxylate, 1,2-dipentyl 3-heptyl 2-hydroxypropane-1,2,3-tricarboxylate, 1,3-dipentyl 2-heptyl 2-hydroxypropane-1,2,3-tricarboxylate, 1-pentyl 2,3-diheptyl 2-hydroxypropane-1,2,3-tricarboxylate and 2-butyl 1,3-diheptyl 2-hydroxypropane-1,2,3-tricarboxylate.

2. The plasticizer composition of claim 1, wherein the weight ratio of the terephthalate-based material to the citrate-based material is in a range of 80:20 to 50:50.

3. The plasticizer composition of claim 1, further comprising an epoxidized oil.

4. The plasticizer composition of claim 3, wherein the epoxidized oil is included in an amount of 1 part by weight to 100 parts by weight based on 100 parts by weight of the plasticizer composition.

5. A resin composition comprising:
   100 parts by weight of a resin; and
   5 parts by weight to 150 parts by weight of the plasticizer composition of claim 1.

6. The resin composition of claim 5, wherein the resin comprises at least one selected from the group consisting of ethylene vinyl acetate, polyethylene, polypropylene, polyvinyl chloride, polystyrene, polyurethane, and a thermoplastic elastomer.

7. The resin composition of claim 5, wherein the resin composition is a material of at least one product selected from the group consisting of electric wires, flooring materials, automotive interior materials, films, sheets, wallpaper, and tubes.

* * * * *